(12) United States Patent
Arlt et al.

(10) Patent No.: US 7,761,995 B2
(45) Date of Patent: Jul. 27, 2010

(54) GEAR WHEEL WITH A MULTIPLE HELICAL TOOTHING, PRESSED IN ONE PART, AND A METHOD AND DEVICE FOR MANUFACTURING THE SAME

(75) Inventors: Manfred Arlt, Heiningen (DE); Gerhard Subek, Aalen (DE); Thomas Franz, Reutte (AT); Christian Reimann, Aalen (DE); Otto Stock, Oberkochen (DE); Anton Eiberger, Ellenberg (DE)

(73) Assignee: Schwaebische Huettenwerke Automotive GmbH & Co. KG, Aslen-Wasseralfingen (DE)

( * ) Notice: Subject to any disclaimer, the term of this patent is extended or adjusted under 35 U.S.C. 154(b) by 116 days.

(21) Appl. No.: 11/580,403

(22) Filed: Oct. 13, 2006

(65) Prior Publication Data

US 2007/0028446 A1  Feb. 8, 2007

Related U.S. Application Data

(62) Division of application No. 10/439,628, filed on May 16, 2003, now Pat. No. 7,140,269.

(30) Foreign Application Priority Data

May 17, 2002  (DE) .................... 102 22 132

(51) Int. Cl.
| | |
|---|---|
| *B21D 22/00* | (2006.01) |
| *B21D 45/00* | (2006.01) |
| *B21D 53/28* | (2006.01) |
| *B21J 13/00* | (2006.01) |
| *B22F 3/00* | (2006.01) |
| *B22F 3/02* | (2006.01) |
| *B22F 3/15* | (2006.01) |
| *C22C 1/04* | (2006.01) |
| *F16H 55/17* | (2006.01) |

(52) U.S. Cl. ............ 29/893.34; 29/893; 29/893.36; 72/343; 72/353.6; 72/354.2; 72/355.6; 72/360; 74/458; 419/48; 419/49; 419/66; 425/78

(58) Field of Classification Search ......... 29/893.36, 29/893.34, 893; 72/355.4, 355.6, 343, 353.6, 72/354.2, 360; 74/458, 466; 419/48, 49, 419/66; 425/78, 150, 411
See application file for complete search history.

(56) References Cited

U.S. PATENT DOCUMENTS

| | | | | |
|---|---|---|---|---|
| 1,443,837 | A | * | 1/1923 | Eberhardt ............... 74/466 |
| 3,694,127 | A | | 9/1972 | Takahashi et al. |
| 3,909,167 | A | * | 9/1975 | Signora ................. 425/78 |
| 5,043,123 | A | | 8/1991 | Gormanns et al. |
| 5,209,705 | A | | 5/1993 | Gregg |
| 5,259,744 | A | | 11/1993 | Take |
| 5,378,416 | A | | 1/1995 | Kishi et al. |
| 5,421,789 | A | | 6/1995 | Gregg |
| 5,659,955 | A | | 8/1997 | Plamper |
| 5,698,149 | A | | 12/1997 | Hinzmann et al. |
| 5,865,239 | A | | 2/1999 | Carr |
| 5,903,815 | A | * | 5/1999 | Scott ................... 428/564 |
| 5,996,229 | A | * | 12/1999 | Yang .................. 29/893.34 |
| 6,044,555 | A | | 4/2000 | Jacob et al. |
| 6,283,686 | B1 | * | 9/2001 | Gill .................... 409/26 |
| 6,318,986 | B1 | | 11/2001 | Hinzmann et al. |
| 6,365,094 | B1 | | 4/2002 | Hinzmann et al. |
| 6,383,447 | B1 | * | 5/2002 | Nakata et al. ............ 419/66 |
| 6,440,357 | B1 | * | 8/2002 | Hinzmann ............... 419/66 |
| 6,569,364 | B2 | | 5/2003 | Yanase et al. |
| 6,698,267 | B1 | | 3/2004 | Olsson |
| 2005/0084407 | A1 | | 4/2005 | Myrick |
| 2006/0105073 | A1 | | 5/2006 | Hogenkamp et al. |

FOREIGN PATENT DOCUMENTS

DE  28 42 885  4/1980

OTHER PUBLICATIONS

The Hutte Academic Society, Reg. Ass. In Berlin, Hutte the Engineer's Handbook, 28 revised edition Mechanical Engineering Part A, Berlin 1954, pp. 178, 179, Wilhelm Ernst & Son, Publishers, Published in Germany.

* cited by examiner

*Primary Examiner*—David P Bryant
*Assistant Examiner*—Alexander P Taousakis
(74) *Attorney, Agent, or Firm*—RatnerPrestia (57) ABSTRACT

A gear wheel includes multiple helical toothings, each having a different helical angle. A pressing method for molding a gear wheel involves introducing a compactable material into a chamber of a pressing tool, compacting the material, exposing the helical toothings of the gear wheel, and removing the molded body from the pressing tool. A pressing tool for pressing, as one part, a gear wheel, includes a matrix, cylindrical first and second molding tool parts which can be translated along and then rotated about a longitudinal axis, and a driver coupled to the molding tool parts or driving them. The molding tool parts can be moved towards and away from each other and the inner surface of the matrix delimits the chamber and is shaped to allow a linear axial sliding movement of the compactable material relative to the matrix.

8 Claims, 4 Drawing Sheets

GEAR WHEEL WITH A MULTIPLE HELICAL TOOTHING, PRESSED IN ONE PART, AND A METHOD AND DEVICE FOR MANUFACTURING THE SAME

CROSS REFERENCE TO RELATED APPLICATIONS (IF APPLICABLE)

This application is a Divisional Application of Ser. No. 10/439,628, filed on May 16, 2003 now U.S. Pat. No. 7,140,269.

FIELD OF THE INVENTION

The invention relates to a gear wheel with a multiple helical toothing, which is obtained in one part by pressing. The invention further relates to a pressing method for original molding the gear wheel as one part and to a device for such a pressing method.

BACKGROUND OF THE INVENTION

One way of reducing the running noise of gear wheels is to use gear wheels with a helical toothing. In order to eliminate axial forces caused by this, the use of gear wheels with two helical toothings comprising single helical toothings which point counter to each other, in particular the use of gear wheels with a double helical toothing, is known. The double helical toothing is formed by two helical toothings, arranged alongside each other and pointing counter to each other, having identical reference circles.

In order to manufacture a gear wheel with a double helical toothing, U.S. Pat. No. 5,659,955, for example, discloses pressing and sintering circular cylindrical gear wheel compacts having simple cylindrical surface areas, providing each of the cylindrical bodies obtained in this way with a single helical toothing by original molding, namely rolling, and connecting the single helical toothings to each other non-positively by means of press fitting. The manufacturing method includes the steps of original molding, forming and joining. Individual means are required for each of these methods, namely a pressing tool, a sintering furnace, a rolling tool and a joining means. Cost-effective mass production is scarcely possible using such a method.

U.S. Pat. No. 5,865,239 discloses manufacturing gear wheels with a double helical toothing by means of injection molding. The method is described primarily for plastic gear wheels. Reference is, however, made to the fact that it is also intended to be usable for metallic gear wheels. In this case, however, the method would be restricted to the use of casting materials.

U.S. Pat. No. 5,259,744 describes a pressing tool and a pressing method for manufacturing a gear wheel with two helical toothings. The helical toothings can be inner toothings or outer toothings. However, only helical toothings which point in the same direction and exhibit identical helical angles can be obtained using the method and the two devices of this citation.

U.S. Pat. No. 3,694,127 discloses pressing, in one part, a gear wheel with two helical toothings. The pressing tool includes a rotationally mounted matrix comprising a helical toothing on its inner surface area. An upper die and a lower die each comprise an outer toothing, via which they engage with the toothing of the matrix. The hollow cylindrical lower die comprises a further helical toothing on its inner surface area. The two dies are axially moved towards each other via their engagement with the helical toothing of the matrix, in order to compact the powder material. The helical toothing on the inner surface area of the matrix and the helical toothing on the inner surface area of the lower die mould the two helical toothings of the gear wheel. The devices and methods described in this specification, however, are restricted to the manufacture of helical toothings which exhibit different reference circles.

A method and a device for pressing, as one part, a gear wheel with two toothings are known from U.S. Pat. No. 5,698,149. The toothings, each of them single, exhibit an offset with respect to each other by being offset along the circumference of the gear wheel with respect to each other. A pressing tool comprising a lower matrix, an upper matrix, a lower die assembly and an upper die assembly is used for pressing. The hollow cylindrical matrices, movable relative to each other, are provided with toothings on their inner surface areas, on which the toothings of the gear wheel are molded by pressing. For pressing, a compactable material is filled into a chamber formed by the lower matrix and the lower die assembly. Once the chamber has been closed by driving the matrices against each other, the chamber is axially shifted relative to the matrices. The matrices are then rotated about the common longitudinal axis relative to each other, in order to obtain the offset. In the position then assumed by the matrices, the dies of the two die assemblies are moved towards each other and the material is thus compacted. Lastly, the double gear wheel pressing obtained in this way is removed from the tool.

Molding a gear wheel with a multiple helical toothing would be problematic using the device of U.S. Pat. No. 5,698,149. For directly after pressing, when the matrix is necessarily opened, an elastic expansion of the matrix halves would act on the molded part as the pressing force was relieved, said elastic expansion driving the matrix halves axially away from each other. If the matrix halves were fitted with inner surface areas having a helical toothing, these axial forces in the cross-sectional plane, separating the two matrix halves, would result in fractures in the structure of the gear wheel molding. This problem would increase with the size of the gear wheel molding, both with increasing diameter and with increasing axial width.

SUMMARY OF THE INVENTION

It is an object of the invention to cost-effectively provide a gear wheel comprising at least two helical toothings which each have a different helical angle, by pointing counter to each other or by having different magnitudes or by realizing both in combination. The gear wheel should exhibit a homogenous structure with an absence of or at least reduction in fractures. Furthermore, a method and a device are to be provided which are suitable for manufacturing such a gear wheel. The at least two helical toothings of the gear wheel preferably have the same root circle diameter.

A pressing method in accordance with the invention, for molding a gear wheel with a multiple helical toothing in one part, includes the following steps when using a pressing tool in accordance with the invention:

A compactable material is introduced into a chamber of a pressing tool. The pressing tool includes a matrix and at least two molding tool parts which are mounted such that they can be translated back and forth within the matrix along a longitudinal axis of the pressing tool and rotated about the longitudinal axis. Each of the at least two molding tool parts comprises at least one cylindrical surface area which is provided with a helical toothing, in order to mould one of the helical toothings of the gear wheel on it.

The material situated in the chamber is compacted, preferably by at least two dies of the pressing tool moving towards each other along the longitudinal axis and thus pressing the material in the chamber axially and into the helical toothing of each of the molding tool parts. During pressing, each of the surface areas of the molding tool parts provided with the helical toothings forms a side wall of the chamber, such that the helical toothings of the gear wheel are molded by radially pressing the material into the helical toothings of the molding tool parts.

In order to expose the helical toothings of the gear wheel obtained by compacting, the molding tool parts can be moved away from each other along the longitudinal axis, each simultaneously performing a rotational movement relative to the gear wheel. The combined translational and rotational movement is also adjusted to the helical toothing molded by the respective molding tool part, such that this helical toothing cannot be damaged by removing the molding tool part in question. To expose the helical toothings, it is also possible to translate and rotate only one of the molding tool parts relative to the other molding tool part and the gear wheel, while the other helical toothing is exposed by a translational and rotational movement of the gear wheel relative to the other molding tool part, still in tooth engagement at this time.

Once the helical toothings have been exposed, the gear wheel is removed from the pressing tool.

Removing the gear wheel molding in particular is unproblematic, since the molding helical toothings of the pressing tool are not formed on the matrix but on molding tool parts which can be moved towards and away from each other, relative to the matrix. The inner surface area of the matrix is shaped such that the gear wheel is not obstructed from sliding axially along. The matrix does not grip behind the gear wheel, in particular it does not grip behind the helical toothings. The helical toothings of the gear wheel molding can be exposed without tensile stresses. This avoids the danger of microfractures in the axial region of the gear wheel molding between the helical toothings. The structure of the gear wheel obtained in accordance with the invention is and/or remains homogenous, even in this region. This advantage becomes increasingly useful with increasing size of the gear wheels to be molded, both with respect to its diameter and with respect to its axial width, since the axial forces required for pressing also increase with the size of the gear wheel. The invention enables pressing of gear wheels, in one part, with diameters of 100 mm and more. Another advantage is the low fracture density, in particular in the region extending axially between the adjacent toothings.

Furthermore, the molding tool parts advantageously oppose each other along the longitudinal axis, spaced out axially and facing via their front sides, and can be moved towards or away from each other along the longitudinal axis. Such an arrangement enables a gear wheel to be original molded, comprising helical toothings which have the same root circle diameter or root circle diameters which deviate only slightly from each other, wherein in the case of different root circle diameters, these root circle diameters should not deviate from each other by more than 10%. Molding the gear wheel with identical root circle diameters of the helical toothings is, however, preferred.

In preferred example embodiments, the at least two molding tool parts having the molding helical toothings exhibit the same shape with helical toothings running counter to each other, such that with the aid of them a gear wheel with a double helical toothing is obtained, i.e. a gear wheel with helical toothings arranged counter to each other but otherwise identical. However, the invention is in principle not restricted to this. Comparable advantages with respect to easily removing the gear wheel and to the absence of or reduction in fractures are also obtained if the surface areas of the molding tool parts which are provided with the helical toothings exhibit different diameters, and similarly if the helical toothings of the molding tool parts differ in magnitude with respect to their helical angles.

The molding tool parts are preferably formed hollow cylindrical. Furthermore, the helical toothing of the first molding tool part and the helical toothing of the second molding tool part are preferably each formed on an inner surface area of the molding tool part in question, in order to obtain a gear wheel with an external multiple helical toothing. However, the possibility should not be excluded that the helical toothings of the molding tool parts serving for molding are formed on outer surface areas, in order to mould the at least two helical toothings on inner surface areas of a gear wheel. A mixed shape, comprising an outer helical toothing and an inner helical toothing, may be realized, with correspondingly formed molding tool parts.

The matrix can be in a number of parts, for example with an axially running separation, in order to afford additional flexibility with regard to performing the method or with regard to the shape of the gear wheel. Though the parts of such a matrix do not then have to be moved axially from each other to expose the helical toothings, the matrix is, however, preferably formed as one part.

An inner surface area of the matrix delimits a part of the pressing tool chamber, until compacting the material is begun and also during compacting as a whole. The inner surface area of the matrix is preferably smooth and particularly preferably simply circular cylindrical. In a preferred embodiment, the matrix primarily supports the molding tool parts radially and only delimits a small part of the chamber itself. The molding tool parts preferably each exhibit a smooth surface area in their supported section.

In a preferred embodiment, the pressing tool further comprises a first die and a second die which can be translated back and forth along the longitudinal axis. In order to compact the material, the two dies are translated towards each other. For removing the gear wheel, they are moved away from each other. Furthermore, they can also advantageously be translated in the same direction as each other, in order to shift the pressing tool chamber relative to the matrix, for example after the chamber has been closed and/or in order to remove the gear wheel. The dies can be completely plane on their mutually facing front areas which form axial delimiting areas of the pressing tool chamber, or however can comprise protrusions and/or recesses in order to form moldings and/or protruding sections, for example gear wheel trunnions, on the front areas of the gear wheel.

The helical toothings of the molding tool parts are preferably already moved into the chamber before compacting is begun, and moved to a position from which they can be moved towards each other during compacting. In this preferred embodiment of the method, the first and second dies and the molding tool parts are moved towards each other during compacting. As appropriate, it may be advantageous if the molding tool parts are again moved slightly further towards each other along the longitudinal axis, after said compacting, and thus of course rotate about the longitudinal axis in accordance with the helical angle of their molding helical toothings. Such secondary compacting, in which a small piece of each of the helical toothings would also be molded, can be advantageous, in order to compress the material situated in an intermediate space remaining between the mutually facing and opposing front sides of the molding tool parts. In a preferred embodiment of the method, however, the first die and the second die and also the molding tool parts are moved towards each other during the duration of compacting as a whole, and reach their axial end positions simultaneously. In this case, there is no secondary compacting. The translational speeds of the dies relative to the molding tool parts are adjusted accordingly.

The pressing tool further includes a drive means for driving the molding tool parts provided with the molding helical toothings. If, in addition to these molding tool parts, other parts of the pressing tool are arranged such they can be moved relative to a framework of the pressing tool, for example the matrix and/or the at least two dies, then the drive means also includes the drive elements required for driving the other pressing tool parts. Lastly, a control means for the drive means is also provided, in order to move the molding tool parts and, as appropriate, the other movable parts of the pressing tool in a mutually adjusted way by means of the drive means, for the purpose of compacting and removing the gear wheel, including exposing the helical toothings. The control means can be formed to be electronic or hydraulic. Preferably, however, it is a mechanical control means. Advantageously, it operates by compulsory control, which should be alterable by exchanging cams, in order for example to be able to adjust the speed of the driven parts to the conditions, for example to different materials.

In preferred embodiments, only a gear wheel compact is obtained using the method in accordance with the invention, which is then sintered and calibrated in order to finally obtain the finished gear wheel. In principle, however, it would also be conceivable to perform the pressing process in combination with a sintering process, in order to already obtain the gear wheel with the finished helical toothings—still to be calibrated and machined down between the helical toothings as appropriate—at the end of the pressing process. Where the term "gear wheel" is used above and in the claims, this term is intended on the one hand to represent the finished gear wheel, but on the other hand also a gear wheel molding obtained by original molding and—as appropriate—sintering, preferably a gear wheel pressing or compact obtained purely from pressing.

It is inherent to one preferred example embodiment of a pressing method that a collar running around the rotational axis of the gear wheel and protruding radially outwards beyond the helical toothings remains between the helical toothings. This collar is preferably removed by being machined down. The collar can in particular be removed by machine-cutting. Preferably, it is turned off on a lathe. This preferably provides a recess running around the rotational axis of the gear wheel, for example a groove reaching as far as the root circle diameter of one of the toothings or of both toothings.

The compactable material is preferably a metal or metal-alloy powder or a mixture of such powders. The compactable material can also be a plastic powder, wherein also in this case, pressing is preferably followed by sintering.

In preferred applications, the gear wheel forms a gear pulley. It can for example be used in a belt drive of an internal combustion motor, to drive a cam shaft and/or auxiliary units of the motor from a crankshaft. U.S. Pat. No. 5,209,705 and U.S. Pat. No. 5,421,789 describe examples of toothed belts with a double helical toothing, for which the gear wheel can be molded.

BRIEF DESCRIPTION OF THE DRAWINGS

A preferred example embodiment of the invention will now be described by way of figures. The features disclosed by the example embodiment, each individually and in any combination of features, advantageously develop the subjects of the claims. There is shown:

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

FIGS. 1 to 5 in this sequence show the course of a pressing process in a pressing tool. Only those parts of the pressing tool are shown which form a chamber K for a material to be compacted. These are a matrix 1, a center rod 2, a first molding tool part 3, a second molding tool part 6, a first die 11 and a second die 12. The matrix 1, the center rod 2, the dies 11 and 12 and molding tool parts 3 and 6 are formed for molding a spur gear wheel with an outer toothing. Where features are described without specific reference to the course of the pressing process, reference is made to FIG. 5.

Figure 5:
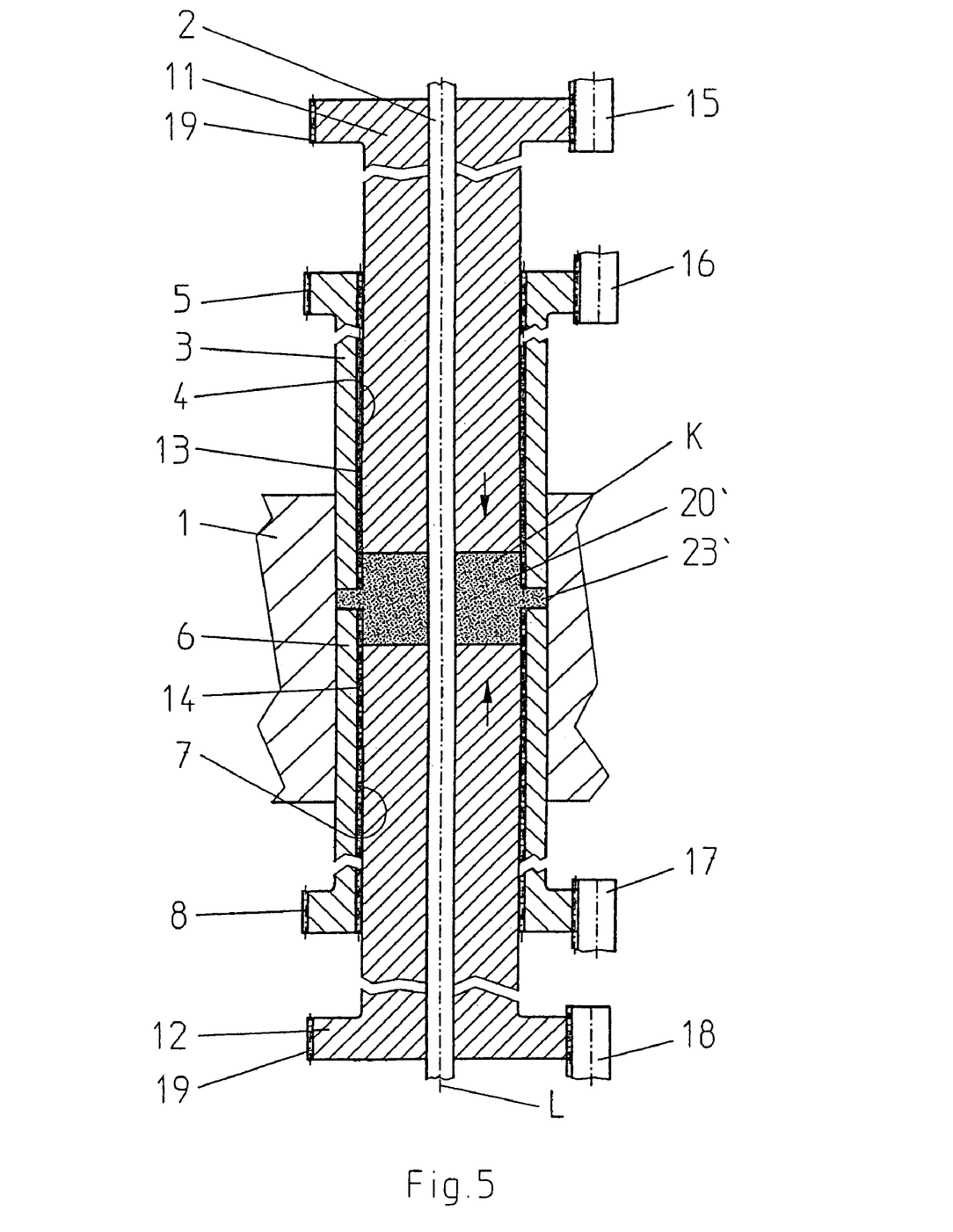
FIG. 5 the pressing tool after the pressing process has been completed.

The matrix 1 is formed, at least in the region of the chamber K, as one part. It surrounds the pressing tool chamber K with its straight, circular cylindrical, smooth inner surface area. The first molding tool part 3 and the first die 11 close the chamber K in an axial direction, and the second molding tool part 6 and the second die 12 close the chamber K on the axially opposing side. A nested arrangement results in the radial direction, outwards from within, in which the two dies 11 and 12 surround the center rod 2, the first molding tool part 3 surrounds the first die 11, and the second molding tool part 6 surrounds the second die 12, and finally the matrix 1 surrounds the two molding tool part 3 and 6, each co-axially with respect to a common longitudinal axis L. The molding tool parts 3 and 6 are radially supported and axially guided on the matrix 1 via their smooth, circular cylindrical outer surface areas.

The molding tool parts 3 and 6 and the dies 11 and 12 are mounted in a framework of the pressing tool such that they can be translated back and forth along the longitudinal axis L. The first molding tool part 3 is mounted such that it can be rotated around the longitudinal axis L relative to the first die 11 and translated back and forth along the longitudinal axis L.

Similarly, the second molding tool part 6 is mounted such that it can be rotated around the longitudinal axis L relative to the second die 12 and translated back and forth along the longitudinal axis L. The molding tool parts 3 and 6 are rotationally driven about the longitudinal axis L. During this rotational movement relative to the dies 11 and 12, they simultaneously perform a translational movement relative to the dies 11 and 12.

The first molding tool part 3 includes a helical toothing 4 over its entire length, on its inner surface area. The second molding tool part 6 likewise comprises a helical toothing 7 over its entire length, on its inner surface area. In magnitude, the two helical toothings 4 and 7 have the same helical angle and are orientated such that two helical toothings are obtained, axially alongside each other, on the gear wheel pressing by the pressing process, forming a double helical toothing.

The pressing tool comprises a drive means for driving the two dies 11 and 12 and the two molding tool parts 3 and 6. The movable parts 3, 6 11 and 12 are driven by a single motor, the movements of said parts being adjusted via mechanical transmissions.

The drive means is indicated in FIG. 5 in a schematic representation, wherein only the drive wheels 15 to 18 of the drive, engaging directly with the molding tool parts 3 and 6 and the dies 11 and 12, are shown. The molding tool parts 3 and 6 and the dies 11 and 12 are rotationally driven, adjusted to each other, via the drive wheels 15 to 18. For being rotationally driven, the molding tool parts 3 and 6 and the dies 11 and 12 comprise drive toothings 5, 8 and 19, which are each in tooth engagement with one of the drive wheels 15 to 18.

The first die 11 is provided with an outer toothing 13 which forms a counter toothing to the helical toothing 4 of the first molding tool part 3 and is in tooth engagement with it. The second die 12 is provided with an outer toothing 14 which forms a counter toothing to the helical toothing 7 of the second molding tool part 6 and is in tooth engagement with it. These two tooth engagements determine the relative translational movements, caused by rotational driving, between the first molding tool part 3 and the first die 11 on the one hand and the second molding tool part 6 and the second die 12 on the other hand. For being rotationally driven, the first molding tool part 3 comprises a drive toothing 5 and the second molding tool part 6 comprises a similar drive toothing, which are in tooth engagement with the drive wheels 16 and 17. The dies 11 and 12 can be rotationally driven via their drive toothings 19 relative to the molding tool parts 3 and 6 and can also be translated relative to the molding tool parts 3 and 6, due to their respective tooth engagement via the helical toothings 4 and 13 on the one hand and 7 and 14 on the other.

A mechanical control means ensures that the parts to be moved in a pressing process are driven at optimal speeds with respect to the pressing product.

Figure 1:
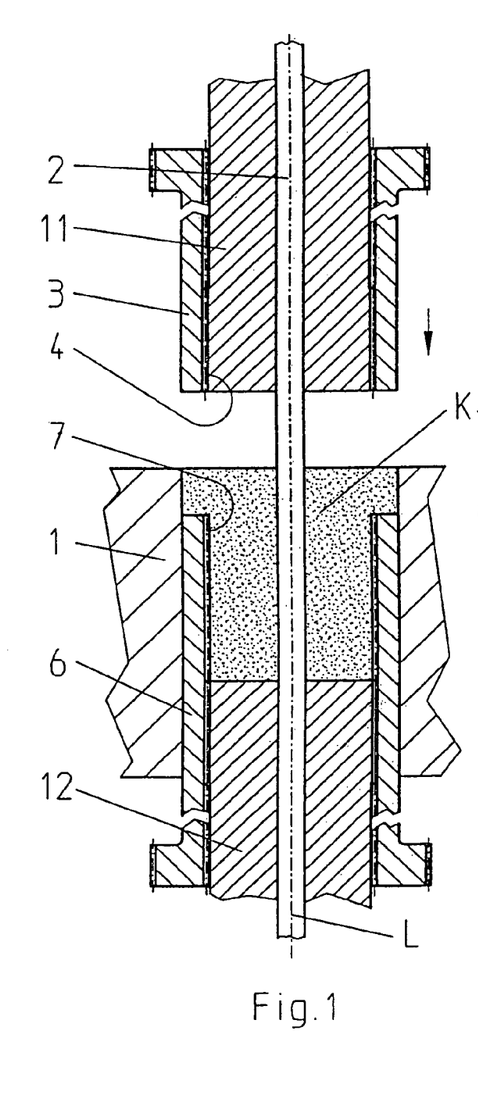
FIG. 1 a pressing tool comprising a chamber which is filled with a powder but is not yet closed.

In the position shown in FIG. 1, the matrix 1 and the second molding tool part 6 form a casing and the second molding tool part 6 together with the second die 12 forms a base of the open-top pressing tool chamber K. The second molding tool part 6 is situated in an axial position in which it reaches almost as far as the upper edge of the chamber K formed by the matrix 1. The chamber K is uniformly filled with a metal-alloy powder or a metallic powder mixture, up to its upper edge defined by the matrix 1. A chamber section surrounded by the matrix 1 remains above the second molding tool part 6, wherein said section reaches as far as the upper edge of the matrix 1 and is filled with powder. The first molding tool part 3 and the first die 11, which together form an upper die assembly, are situated at a distance above the chamber K.

From this position, the first molding tool part 3 is shifted along the longitudinal axis L towards the second molding tool part 6, until it seals the chamber K sufficiently tightly that no powder can escape. The closing movement of the molding tool part 3 used is indicated in FIG. 1 by an arrow.

Figure 2:
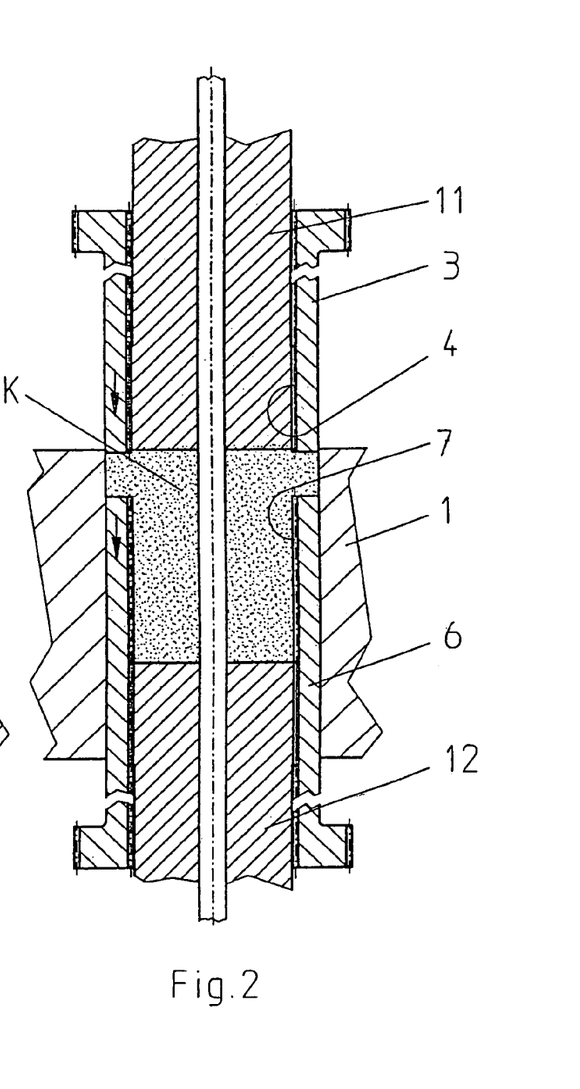
FIG. 2 the pressing tool directly after the chamber has been sealed.

In FIG. 2, the closing movement of the first molding tool part 3 relative to the matrix 1 and the molding tool part 6 as well as the die 12 has been completed. The chamber K has been closed powder-tight. The first molding tool part 3 has been moved slightly further into the chamber K, below the upper edge of the matrix 1. In this position, the front free ends of each of the molding tool parts 3 and 6 axially oppose each other at a short distance, such that an intermediate space, filled with the still powdery material, remains between them and is surrounded by the matrix 1. The free end of the die 11 lies axially at the same height as the upper edge of the matrix 1.

Figure 3:
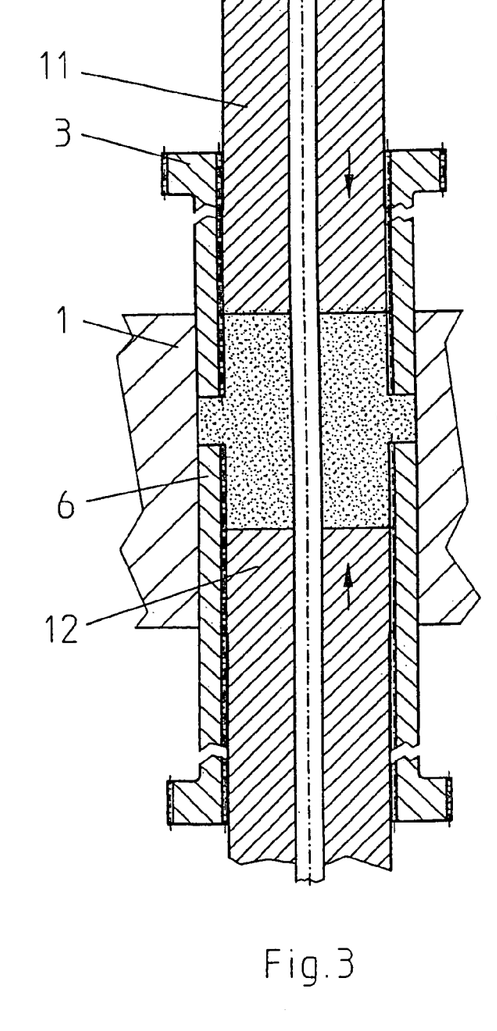
FIG. 3 the pressing tool, after positioning molding tool parts of the pressing tool.

From this position, the two molding tool parts 3 and 6 are moved in the same direction along the longitudinal axis L up to an initial position, axially central with respect to the chamber K, from which the pressing process is started. In the initial position, the molding tool parts 3 and 6 and the dies 11 and 12 are symmetrical, and in this sense centrally positioned, with respect to a cross-sectional plane which extends perpendicular to the longitudinal axis L. The initial position is shown in FIG. 3. In FIG. 2, the common movement of the molding tool parts 3 and 6 leading into the initial position is indicated by directional arrows. Rotationally driving the molding tool parts 3 and 6, which via the helical toothings 4 and 7 causes the translational movement, is adjusted such that the translational speed of the molding tool parts 3 and 6 is the same during the movement into the initial position. The material situated between the front ends of the molding tool parts 3 and 6 is therefore not compacted further by this movement, but is at least primarily shifted only axially along the matrix 1. During this movement of the molding tool parts 3 and 6, the two dies 11 and 12 preferably maintain their respective positions, i.e. during this movement, they preferably remain stationary. The molding tool part 3 is screwed into the material and the molding tool part 6 is partially screwed out of the material. This minimizes axial pressure forces acting on the material in the region of the helical toothings 4 and 7.

FIG. 3 shows the pressing tool after the molding tool parts 3 and 6 have been positioned, as said. From this position, the dies 11 and 12 are moved towards each other along the longitudinal axis L, which is again shown in FIG. 3 by a directional arrow. The dies 11 and 12 are rotationally driven to generate their translational movement via their drive wheels 15 and 18. They are moved, adjusted to each other, in order to compress the material situated in the chamber K as uniformly as possible.

Figure 4:
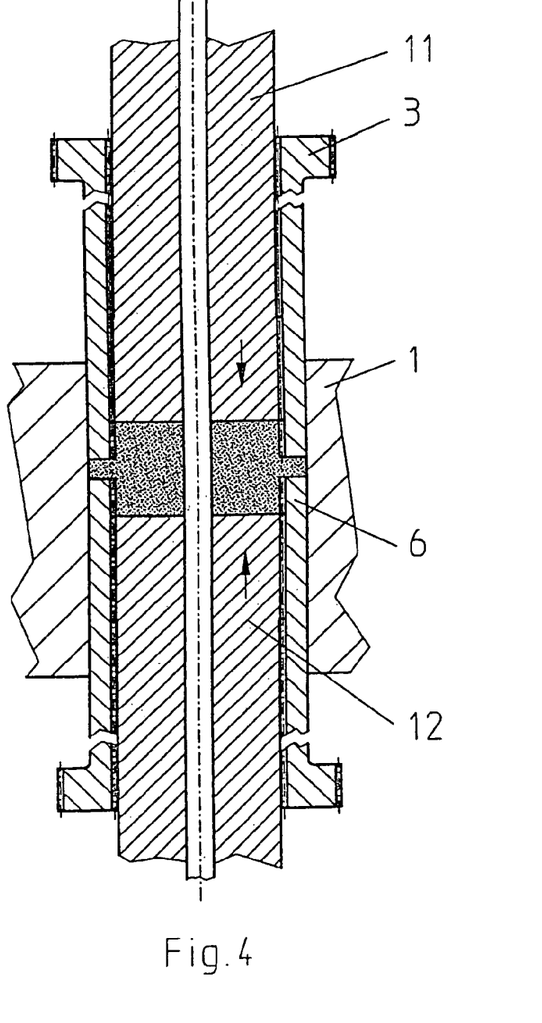
FIG. 4 the pressing tool during a pressing process.

FIG. 4 shows the pressing tool during the pressing process, in an intermediate stage in which the dies 11 and 12 on the one hand and the molding tool parts 3 and 6 on the other are being moved towards each other and are compacting the material. During this pressing process, the molding tool parts 3 and 6 also form matrices which are arranged flush with each other in the longitudinal direction. The combined translational and rotational movements, performed by the molding tool parts 3 and 6 and the dies 11 and 12 during compacting, are adjusted to each other such that the dies 11 and 12 on the one hand and the molding tool parts 3 and 6 on the other are continuously moved towards each other, and in such a way that they reach their end positions simultaneously. The molding tool parts 3 and 6 and the dies 11 and 12 are thus simultaneously fixed in their end positions. Since the parts between which the material is compressed—in the example embodiment, the molding tool parts 3 and 6 on the one hand and the dies 11 and 12 on the other—are simultaneously moved towards each other during compacting as a whole, until they reach their end positions, the material in the chamber K is uniformly compressed, forming a homogeneous structure. During compressing, the translational speeds of the molding tool parts 3 and 6 are preferably the same. Preferably, the translational speeds of the dies 11 and 12 are also the same during compressing.

In FIG. 5, the dies 11 and 12 and the molding tool parts 3 and 6 are shown in their end positions, which they assume directly after the pressing process has been completed. The two molding tool parts 3 and 6 oppose each other via axial front sides, these mutually facing front sides being separated only by a bulge-like collar 23' of pressed powder material.

The gear wheel pressing 20' formed in the chamber K then has to be removed from the chamber K. To this end, the first molding tool part 3 and the first die 11, i.e. the upper die assembly, are moved upwards out of the matrix 1 in a first step. During this translational movement, at least the first molding tool part 3 is rotationally driven about its longitudinal axis L, in order to carefully expose the helical toothing of the gear wheel pressing 20', molded by the first molding tool part 3. The first molding tool part 3 is so to speak screwed off the gear wheel pressing 20'. The translational movement performed jointly by the first molding tool part 3 and the die 11 is performed until enough space has been created above the matrix 1 to remove the gear wheel pressing 20'. The second molding tool part 6 and the second die 12 are then jointly moved slightly further upwards axially, until the collar 23' is exposed. During this translational movement, there are preferably no relative rotational movements between the second molding tool part 6 and the second die 12. As soon as the collar 23' has been exposed, the second die 12 is rotationally driven about the longitudinal axis L relative to the matrix 1 and relative to the second molding tool part 6, such that the second die 12 is moved upwards, together with the gear wheel pressing 20' resting on it, relative to the second molding tool part 6 and thus also gently exposes the other helical toothing of the gear wheel pressing 20'.

Figure 6:
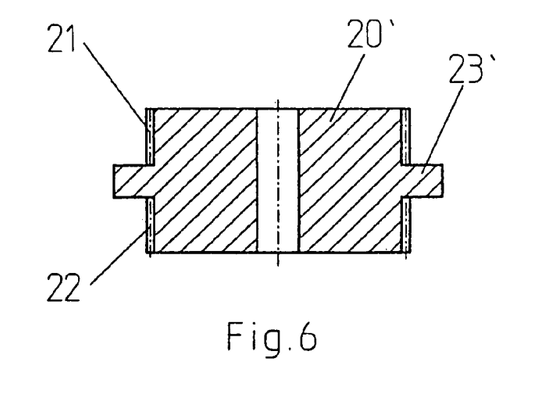
FIG. 6 a gear wheel pressing obtained by pressing, in a longitudinal section.

FIG. 6 shows the gear wheel pressing 20' after it has been removed from the pressing tool. The gear wheel pressing 20' comprises the circumferential collar 23', made from the pressed powder material, between its two helical toothings 21 and 22.

Figure 7:
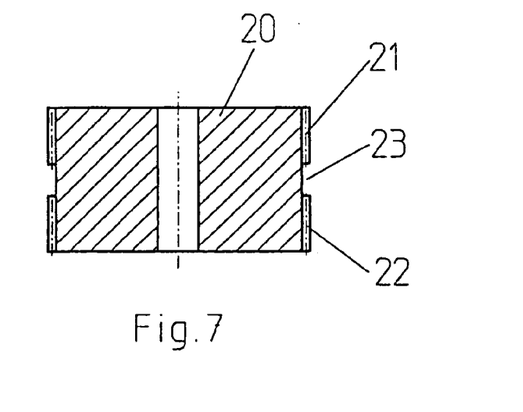
FIG. 7 the gear wheel obtained from the gear wheel pressing by sintering and machine finishing, in a longitudinal section.
Figure 8:
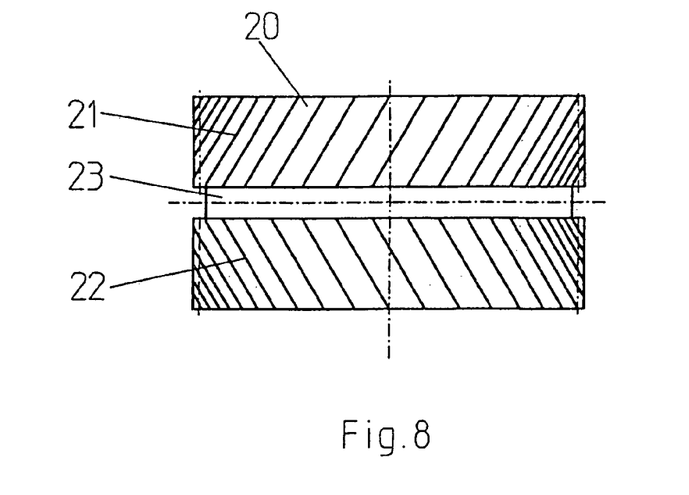
FIG. 8 the gear wheel in a view.

The gear wheel pressing 20' is sintered, and after sintering the collar 23' is removed by way of suitable machine finishing, for example turned off on a lathe. The collar 23' can instead also be removed while still on the pressing 20'. By removing the collar 23', a groove-shaped, circumferential recess 23 is formed which extends axially from one to the other of the helical toothings 21 and 22. The finished gear wheel 20 is shown in a longitudinal section in FIG. 7 and in a view onto the double helical toothing 21/22 in FIG. 8.

In the foregoing description, a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed:

1. A pressing method for molding a gear wheel with a multiple helical toothing comprising the steps of:
    a) introducing a compactable material into a chamber of a pressing tool which includes a matrix, a first molding tool part and a second molding tool part, wherein said first molding tool part and said second molding tool part are mounted such that they can be translated back and forth within the matrix along a longitudinal axis and rotated about the longitudinal axis and each comprises at least one cylindrical surface with a helical toothing;
    b) compacting the material in said chamber by moving the molding tool parts in a combined axial and rotational movement along and about the longitudinal axis towards each other thereby pressing the material into the cylindrical surfaces with the helical toothings, in order to obtain the gear wheel with helical toothings corresponding to the cylindrical surfaces with helical toothings of the molding tool parts;
    c) exposing the helical toothings of the gear wheel by translating the molding tool parts away from each other along the longitudinal axis and by the molding tool parts each performing a rotational movement about the longitudinal axis as they are translated while the gear wheel is performing a linear axial sliding movement relative to the matrix; and
    d) removing the molded body from the pressing tool; further comprising the steps of sintering the pressed gear wheel and molding a collar on the gear wheel by the pressing method when machined down, wherein the collar runs about a rotational axis of the gear wheel between a first helical toothing and a second helical toothing formed by the helical toothings of the molding tool parts.

2. The pressing method as set forth in claim 1, wherein after the step of introducing a compactable material into the chamber, the step of moving the first molding tool part and the second molding tool part jointly in the matrix along the longitudinal axis to a position from which compacting is performed.

3. The pressing method as set forth in claim 1, further comprising the step of filling the chamber with the compactable material, which chamber is formed between the axially opposing, mutually facing front sides of the molding tool parts during the pressing method as a whole.

4. The pressing method as set forth in claim 1, wherein a first die assembly, which includes the first molding tool part and a first die, and a second die assembly, which includes the second molding tool part and a second die, axially delimit the chamber, and wherein moving the molding tool parts and dies towards each other compacts the material.

5. The pressing method as set forth in claim 4, wherein the step of exposing at least one of the helical toothings comprises the step of holding the gear wheel between the first die and the second die, while at least one of the molding tool parts is translated along the longitudinal axis and rotated about the longitudinal axis, out of engagement with the at least one of the helical toothings.

6. The pressing method as set forth in claim 1, wherein the step of exposing one of the helical toothings of the gear wheel comprises the step of translating the gear wheel along the longitudinal axis and rotating the gear wheel about the longitudinal axis, out of engagement with one of the molding tool parts.

7. A pressing method for molding a gear wheel with a multiple helical toothing comprising the steps of:
    a) introducing a compactable material into a chamber of a matrix with a first molding tool part located in a lower portion of said chamber, the first molding tool part comprising at least one cylindrical surface with a helical toothing and a first end face;

b) moving a second molding tool part into the chamber with compactable material therein, the second molding tool part comprising at least one cylindrical surface with a helical toothing and a second end face, wherein said first molding tool part and said second molding tool part are mounted such that they can be translated back and forth within the matrix along a longitudinal axis and rotated about the longitudinal axis;

c) compacting the material in said chamber by moving the molding tool parts axially towards each other thereby pressing the material into the cylindrical surfaces with the helical toothings and stopping the first and second end faces spaced from one another such that a circumferential collar is defined about the gear wheel between the helical toothings of the gear wheel;

d) exposing the helical toothings of the gear wheel by translating the molding tool parts away from each other along the longitudinal axis and by the molding tool parts each performing a rotational movement about the longitudinal axis as they are translated while the gear wheel is performing a linear axial sliding movement relative to the matrix; and e) removing the molded body from the pressing tool.

8. The pressing method as set forth in claim 7 further comprising the step of removing the circumferential collar by way of a suitable finishing procedure.

* * * * *